United States Patent

Hehl

[11] 3,868,061
[45] Feb. 25, 1975

[54] INJECTOR NOZZLE WITH SHUTOFF VALVE FOR INJECTION MOLDING MACHINE

[76] Inventor: Karl Hehl, Siedlung 183, Lossburg/Wuerttemberg, Germany

[22] Filed: Feb. 21, 1973

[21] Appl. No.: 334,419

[30] Foreign Application Priority Data
Feb. 21, 1972 Germany.............................. 2208014
July 12, 1972 Germany.............................. 2234156

[52] U.S. Cl................................. 239/571, 239/533
[51] Int. Cl................................................. B05b 1/30
[58] Field of Search..................... 239/533, 570, 571

[56] References Cited
UNITED STATES PATENTS

| | | | |
|---|---|---|---|
| 1,137,926 | 5/1915 | Teeter............................. | 239/571 X |
| 1,876,980 | 9/1932 | Lentell, Jr...................... | 239/533 X |
| 2,410,946 | 11/1946 | Johnson.......................... | 239/533 X |
| 2,860,010 | 11/1958 | Sennstrom et al.............. | 239/533 |
| 3,243,127 | 3/1966 | Watson........................... | 239/533 X |
| 3,444,886 | 5/1969 | Bailey et al..................... | 239/533 X |

FOREIGN PATENTS OR APPLICATIONS

| | | | |
|---|---|---|---|
| 900,977 | 7/1945 | France............................ | 239/533 |
| 531,349 | 1/1941 | Great Britain.................. | 239/533 |
| 980,905 | 1/1965 | Great Britain.................. | 239/533 |

Primary Examiner—Lloyd L. King
Assistant Examiner—Andres Kashnikow
Attorney, Agent, or Firm—Joseph A. Geiger

[57] ABSTRACT

Injector nozzle with shutoff valve for use in injection molding machines which comprises a nozzle body inside which a plunger assembly is spring-biased toward its closed position against the pressurized plastic flow, the plunger head of the plunger assembly engaging a cylindrical valve bore inside a valve insert which is removably retained in the nozzle body. A pressure surge in the plastic supply causes the plunger assembly to move against the spring bias so that the plunger head moves out of its closed position inside the valve bore, thereby opening the valve for injection of the plastic through the injector mouth of the valve insert.

15 Claims, 16 Drawing Figures

INJECTOR NOZZLE WITH SHUTOFF VALVE FOR INJECTION MOLDING MACHINE

BACKGROUND OF THE INVENTION

1. Field of the Invention

The present invention relates to injector nozzles, and in particular to injector nozzles which have a pressure-activated shutoff valve and which are suitable for use in plastic injection molding machines.

2. Description of the Prior Art

From the prior art in this field are known various injector nozzles for the injection of plastic. Thus, it is known to use an injector nozzle whose plunger assembly is spring biased into a closed position in which the plunger head rests against a valve seat. Such a design is suggested in German Pat. No. 1,147,380; see also Swiss Pat. No. 433,708, especially FIGS. 2 and 3 thereof; and French Pat. No. 1,016,816.

Among the problems encountered with these prior art devices is the fact that a comparatively high spring pressure is required, in order to close the plunger head against its valve seat in opposition to the pressurized plastic flow. Another problem relates to the valve wear under extended use.

SUMMARY OF THE INVENTION

It is a primary objective of the present invention to overcome the above-mentioned shortcomings by suggesting an injector nozzle of the earlier-mentioned type which operates with reduced spring pressure on the plunger assembly and which offers higher longevity of the moving parts.

The invention proposes to attain the above objective by suggesting an injector nozzle which includes a removable valve insert on the injection side of the nozzle body, the valve insert having a cylindrical valve bore into which the plunger head penetrates axially in order to close the valve, and which also serves as a support for the spring which biases the plunger assembly into that closed position. The plunger head, when operated under a pressure surge in the plastic flow, moves out of the valve bore into a wider mixing chamber inside the valve insert, thereby permitting the plastic flow to pass around the plunger head and into the injection passage of the valve insert, through which it leaves the injector nozzle.

This novel injector nozzle has the advantage that the plunger head need not be pressed against the valve seat in the closed position of the shutoff valve, so that less spring pressure is required to maintain the valve closed. The required minimal closing force, at which the valve would just begin to open, is established by accordingly preloading the spring of the plunger assembly.

The invention offers several additional advantageous features: for instance, the removable valve insert makes it possible to quickly adapt the injector nozzle for use with different injection molds, such as molds which operate with prechambers and molds for so-called hot chamber injection. The quick access to the plunger head and valve bore through removal of the valve insert also permits easy inspection and cleaning of these parts by the operating personnel.

A still further advantage of the invention is found in connection with the injection of relatively easy-flowing thermoplastic materials. The particular novel valve configuration in which the plunger head, when returning to its closed position, retracts from the mixing chamber, has the result of creating a suction effect in the mixing chamber, thereby preventing the plastic material in the latter from accidentally dripping from the injector mouth. Lastly, the suggested novel injector nozzle is easy to fabricate, and all its parts, with the exception of the cylindrical plunger head and valve bore, can be fabricated with large manufacturing tolerances.

Certain types of plastic materials require relatively high pressures (e.g. 70 atu, equal to 1,000 p.s.i.) for their injection into the mold. On the other hand, there are also plastic materials whose physical characteristics permit a considerably lower injection pressure (e.g. 40 atu equal to 570 p.s.i.). An additional determining factor of the optimal injection pressure is the shape of the injection mold itself. Because of these varying pressure requirements, it is also necessary to adjust the minimal closure pressure of the shutoff valve accordingly, in order to cause the valve to open when the injection pressure is established inside the injector nozzle.

The minimal closure pressure of the shutoff valve is normally a fixed value and cannot be adjusted. In the past, it was therefore always necessary to remove the entire injector nozzle from the injection unit, whenever a change from one type of plastic material to another called for a change in injection pressure and in the minimal valve closure pressure, or when the minimal valve closure pressure had to be adjusted for other reasons.

In the device of the invention, however, it is possible to quickly and inexpensively change the characteristics of the shutoff valve, by providing interchangeable valve bores of different lengths. For major changes it is further possible to provide interchangeable springs of different strength. A valve disc with a longer cylindrical bore, for example, will require a greater opening displacement of the valve plunger to the point where the valve opens, thereby increasing the minimal closure pressure of the valve spring. A valve disc with a shorter valve bore will accordingly allow the valve to open under a lower injection pressure. These interchangeable valve discs are preferably identical in thickness and outside diameter and symmetrical in their axial cross section, so that no particular skill is required for their insertion and removal.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows.

DESCRIPTION OF THE PREFERRED EMBODIMENTS

Figures 5, 6:
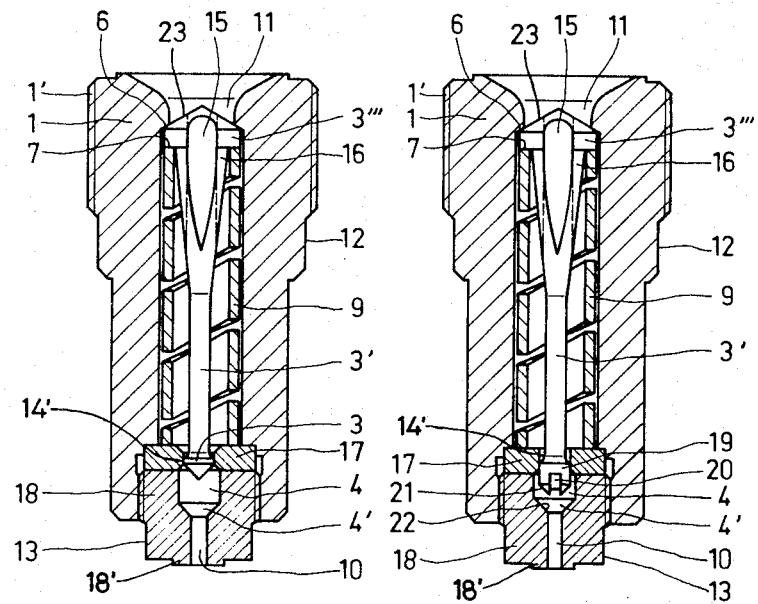
FIG. 5 is a longitudinal cross section of a modified injector nozzle representing a second embodiment of the invention, the shutoff valve being shown in its closed position.
FIG. 6 shows a similar longitudinal cross section of an injector nozzle representing a still further embodiment of the invention.
Figures 7, 8:
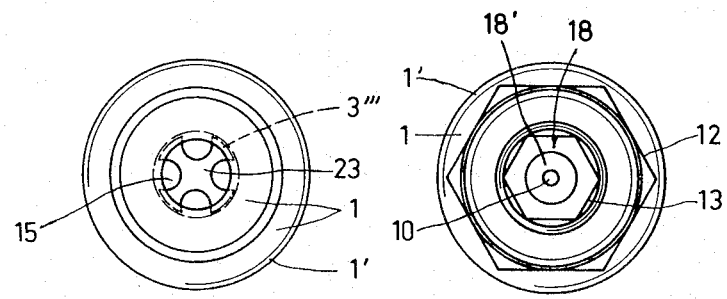
FIG. 7 shows the injector nozzle of FIG. 5 as seen from above.
FIG. 8 shows the injector nozzle of FIG. 6 as seen from below.
Figure 14:
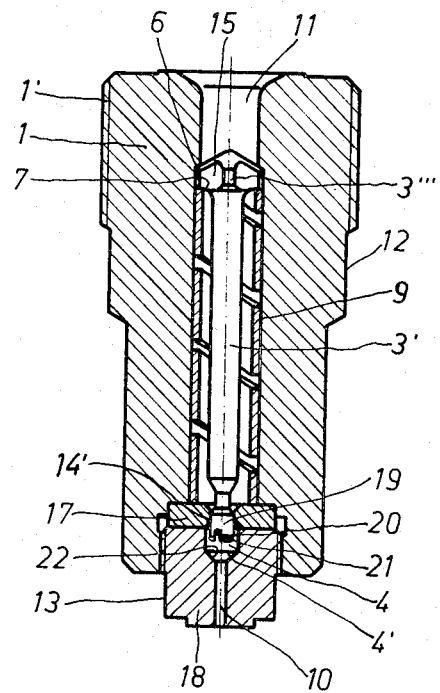
FIG. 14 is a longitudinal cross section of an injector nozzle representing a still further embodiment of the invention comparable to FIG. 6.

The basic structural components of the several embodiments of the invention are identical or similar, and are as follows:

Each injector nozzle has a nozzle body 1 inside which is movably arranged a plunger shown at 3, 3', 3'', and 3''' in FIGS. 1–8; at 3, 3', and 3''' in FIGS. 5 and 7; at 19, 3', and 3''' in FIG. 6; at 30, 3', and 3''' in FIGS. 9–13; and at 19, 3', 3'', and 3''' in FIG. 14. The plunger which is arranged inside a central bore in the nozzle body 1 and which is axially movable, includes a plunger head 3, or 19 or 30, respectively, a plunger shaft 3', and a plunger collar 3'''. During injection, the plastic flows against and around the plunger collar 3''' through longitudinal passages 8, or 15 respectively, arranged in the plunger collar and plunger shaft.

Figure 1:
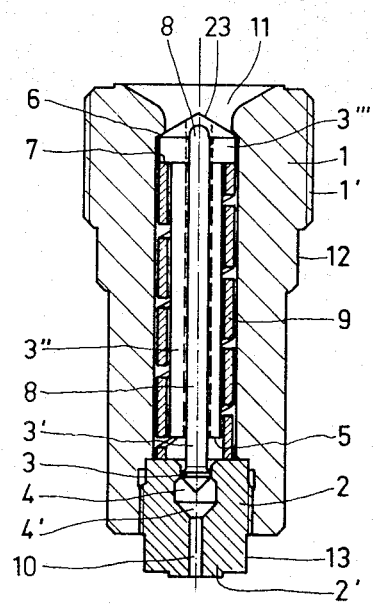
FIG. 1 shows the longitudinal cross section of an injector nozzle representing a first embodiment of the invention, the shutoff valve being shown in its closed position.

Under the plunger collar 3''' is arranged a compression spring 9 which urges the plunger upwardly against a shoulder 6 in the bore of nozzle body 1 against which the plunger collar 3''' abuts in the normal, closed position of the nozzle assembly. In the lower end portion of the nozzle body 1 is removably mounted a valve insert, shown at 2 in FIGS. 1, 2, and 4, and at 17 and 18 in FIGS. 5, 6, and 8–14. This valve insert includes a protruding portion serving as the injector mouth, shown at 2' and 18', respectively. The valve insert 2 has in its upper portion a cylindrical valve bore 14, or 14' respectively, which cooperates with the plunger head 3 to form a shutoff valve. In the upper abutment position of the plunger, as shown in FIG. 1, for example, the plunger head 3 is engaged in the valve bore 14 so as to separate the interior space of the nozzle body 1, which communicates with the nozzle inlet 11, from the injection passage 10 of the injector mouth 2'. The valve insert 2 further includes a mixing chamber 4 in the form of an enlarged cavity between the valve bore 14 and the injection passage 10. The plunger head 3, when advancing downwardly out of the valve bore 14 and into the mixing chamber 4, opens the shutoff valve by allowing the plastic to flow around the plunger 3 and into the injection passage 10.

Figure 2:
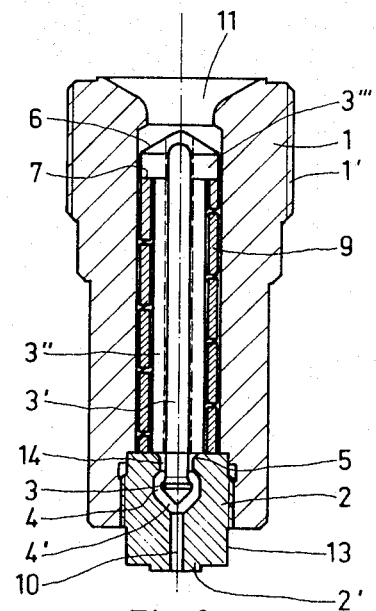
FIG. 2 shows the injector nozzle of FIG. 1 with the shutoff valve in its open position.
Figure 3:
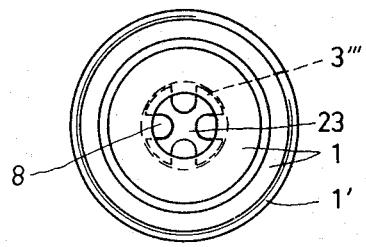
FIG. 3 shows the shutoff valve of FIGS. 1 and 2 as seen from above.
Figure 4:
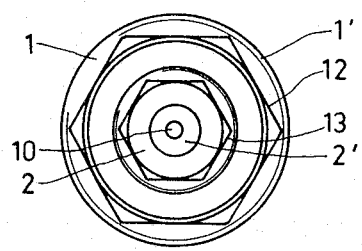
FIG. 4 shows the shutoff valve of FIGS. 1 and 2 as seen from below.

The opening and closing operation of the shutoff valve in the injector nozzle is responsive to the pressure with which the plastic material enters the nozzle 11. A pressure surge beyond a certain valve causes the valve plunger to move downwardly against the closing force of compression spring 9 and away from its normal abutment position, thereby opening the shutoff valve as the plunger head 3 moves into the mixing chamber 4. The fully opened position of the nozzle embodiment of FIG. 1 is shown in FIG. 2. In this position the plunger has reached its lower abutment position in which the lower shoulder of plunger shaft 3'' bears downwardly against the upper face of valve insert 2. The free axial flow of the plastic material along the plunger shaft into the valve bore 14 is assured by the groove-shaped longitudinal passages 8 which communicate with the valve bore 14, even when the plunger shaft 3'' abuts against the valve insert 2. Thus, the axial motion of the plunger inside the cavity of nozzle body 1 is limited by two positive abutments which determine the open and closed positions of the shutoff valve. For their upper abutment seating the plunger collar 3''' and the shoulder 6 of nozzle body 1 are preferably provided with a taper. The valve insert 2 is retained in the lower end portion of the nozzle body 1 by means of a thread connection, the valve insert having a hexagon 13 and the nozzle body having a hexagon 12 for convenient assembly and disassembly.

From the structure of the injector nozzle assembly as shown in FIG. 1, for example, it can easily be seen that the valve insert 2 can be quickly removed from the nozzle body 1 for inspection or replacement. Thus, the invention offers the advantageous feature that a set of different valve inserts can be supplied with each injector nozzle so that a given valve insert can be quickly replaced, if damaged, or if the valve characteristics are to be changed.

In the embodiment illustrated in FIGS. 1–4 the plunger shaft 3'' has a continuous profile which is delineated by a cylindrical outline with 4 longitudinal passages 8 (FIG. 3), the lower end of this shaft profile 3'' being formed by the earlier-mentioned abutment shoulder 5. Between this abutment shoulder 5 and the plunger head 3 extends the plunger neck 3' of reduced diameter which, when the shutoff valve is fully open (FIG. 2), forms a ring channel with the valve bore 14. The compression spring 9 of this embodiment is preferably made of a wire coil which has a rectangular cross section, the spring 9 being accommodated in the annular space between the nozzle bore and the plunger shaft 3''.

The valve insert of this first embodiment (FIGS. 1–4) is made of one piece, the valve bore 14, mixing chamber 4 and injection passage 10 forming one continuous cavity extending axially through the valve insert 2. The valve bore 14 of valve insert 2 is provided with an entry taper on its upper end face and a similar tapered transition to the larger-diameter mixing chamber 4. Between the latter and the much smaller injection channel 10 is provided a similar transition taper 4'. The plunger head 3 itself has a cylindrical seating portion which is similarly bordered by an end taper and by a transition taper between the seating portion and the smaller plunger neck 3'. A continuous annular flow channel devoid of sharp corners is thus formed around the plunger head for a smooth flow of the plastic material during injection.

The embodiments illustrated in FIGS. 5–8 show a modified plunger and a two-piece valve insert. Instead of having a continuous plunger shaft 3″ with a short plunger neck 3′, the plunger of these embodiments has a long plunger neck 3′ and a shortened, tapered plunger shaft 16 connecting the plunger neck 3′ to the plunger collar 3‴. The plunger has again four longitudinal passages 15 through which the plastic material flows past the plunger collar 3‴. The valve insert in this case is provided in two separate parts, viz. a valve disc 17 which contains only the valve bore 14′ and the valve plug 18 which contains the mixing chamber 4 and the injection passage 10 which leads to the injection mouth 18′.

The embodiment of FIG. 5 does not provide a lower abutment for the open valve position of the plunger. Under extremely high injection pressures, there may thus occur a condition in which the compression spring 9 is sufficiently depressed to allow the plunger head 3 to axially traverse the mixing chamber 4 until the taper of the plunger head 3 reaches the transition taper 4′ in the bottom of mixing chamber 4. In this case the valve is obturated again, and the injector nozzle is inoperative. This accidental closing under excess pressure can be obviated by a modification as suggested in the embodiment of FIG. 6 in which the plunger head 19 is provided with a flow groove 20 which maintains a flow channel, even when the taper 21 of plunger head 19 abuts against the taper 4′ of mixing chamber 4. The configurations of FIGS. 5 and 6 also show two versions of the valve disc 17. In one case (FIG. 5), the valve bore 14′ inside disc 17 is provided with an entry taper and an exit taper, in the other case (FIG. 6) the valve bore 14′ has only an exit taper.

The separation of the valve insert into two separate parts, of which only the valve disc is subject to close manufacturing tolerances and to operating wear, represents a substantial simplification in the manufacture of these parts. The valve disc 17 is further preferably provided with identical entry and exit tapers so as to give it a symmetrical cross section, thereby preventing any error in its positioning during assembly.

Figure 9:
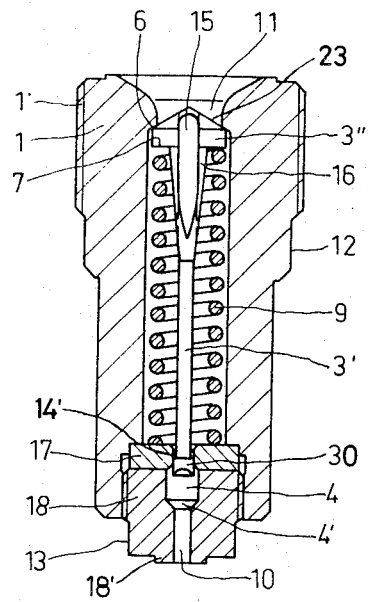
FIG. 9 is a longitudinal cross section of an injector nozzle representing a still further embodiment of the invention, the shutoff valve being shown in its closed position.
Figure 10:
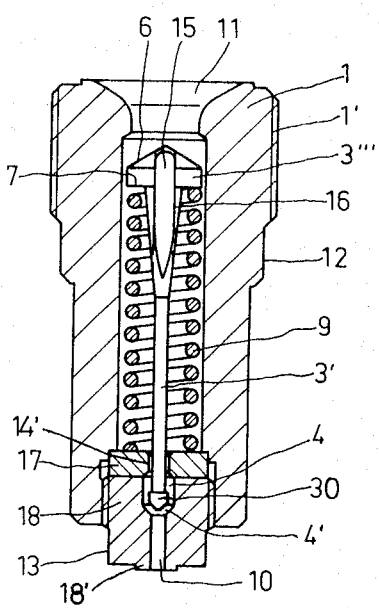
FIG. 10 shows the injector nozzle of FIG. 9 with its shutoff valve in the open position, the latter being rotated 90° from its position in FIG. 9.
Figure 11:
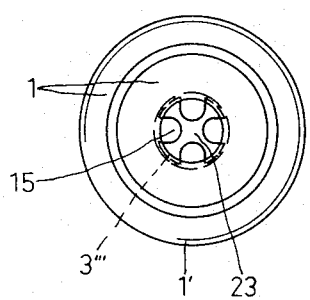
FIG. 11 shows the injector nozzle of FIG. 9 as seen from above.
Figures 12, 13:
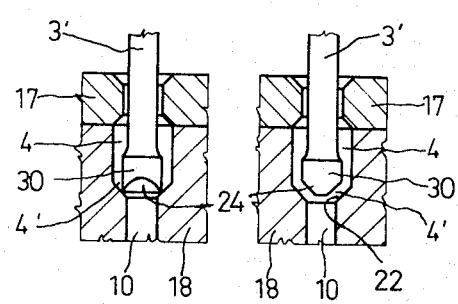
FIG. 12 shows an enlarged detail of the shutoff valve of the injector nozzle of FIG. 9, the valve being shown in its open position.
FIG. 13 shows a similarly enlarged detail of the same shutoff valve, but oriented as shown in FIG. 10.

The force required to open the valve under a pressure surge in the plastic flow is determined by the spring constant of compression spring 9 and by its preload in the assembled condition. The force obtained from a certain pressurization of the plastic flow is of course determined by the surface on which this pressure impinges, which, in the case of the injector nozzle of the invention, is the difference between all downwardly impinged areas and all upwardly impinged areas of the plunger, or simply the cross sectional area of the plunger head or valve bore. The particular configuration of the shutoff valve in the injector nozzle of the invention makes it possible to vary the diameter of the plunger head and valve bore within a considerable range, using either the relatively large diameter as shown in FIGS. 1–4 and 5–8, or a small diameter as shown in FIGS. 9–16. Thus, the smaller shutoff valves require less spring compression for a given injection pressure, and it is possible in such cases to replace the spring of rectangular cross section by a less expensive spring of round wire cross section (FIG. 9).

In FIG. 9 the overall configuration of the plunger and shutoff valve is somewhat similar to that of FIG. 6, except for the plain compression spring 19 and the shape of the plunger head 30. The latter is, as mentioned, of a relatively small diameter and, instead of an end taper and/or flow grooves, has two diametrically opposed oblique faces 24 (FIGS. 12 and 13) which provide flow channels with the bottom taper 4′, when the plunger head 30 abuts downwardly against that bottom taper 4′.

FIG. 14 shows an embodiment in which the plunger neck 3′ is held relatively short, the longer, relatively thick plunger shaft 3″ giving the plunger better rigidity. The downward abutment of the plunger is again provided by the plunger head 19 itself, when the latter reaches the bottom taper 4′ of the mixing chamber 4. The necessary flow passage in the lower abutment position is provided by a groove 20 in the plunger head 19. The plunger of this embodiment is again preloaded by means of a spring 9 of rectangular cross section, the plastic material flowing axially along the plunger through the annular space provided between the plunger shaft 3″ and the inner diameter of spring 9.

Figure 15:
FIGS. 15 and 16 are enlarged cross sections of interchangeable valve discs which are suitable for use in conjunction with FIGS. 5, 6, and 14.
Figure 16:

FIGS. 15 and 16 show two outwardly similar, but in operation dissimilar valve discs 17a and 17b. These valve discs are interchangeable against one another and may cooperate with the same plunger 3, 19, or 30, respectively. The valve discs 17a and 17b have valve bores 14 of identical diameter, their outside diameter and thickness being likewise identical. However, the valve disc 17b has larger entry and exit tapers than the valve disc 17a, thereby providing a shorter opening stroke for the valve plunger and a reduced minimal opening pressure at which the plastic flow just opens the shutoff valve. In each case the entry taper is identical to the exit taper, in order to avoid any possible error of positioning during insertion of the valve disc. This easy, yet foolproof configuration of the shutoff valve permits convenient adjustment and adaptation of the injector nozzle to different operating conditions.

Furthermore, it also makes it possible that such adjustment work may be performed by relatively unskilled operating personnel. A set of different valve discs, as exemplified by the discs 17a and 17b of FIGS. 15 and 16, can be manufactured very inexpensively, in spite of the necessary precision.

It should be understood, of course, that the foregoing disclosure describes only preferred embodiments of the invention and that it is intended to cover all changes and modifications of these examples of the invention which fall within the scope of the appended claims.

What is claimed is:

1. An injector nozzle with a pressure-responsive shutoff valve for injection molding machines and the like, comprising in combination:

a nozzle body assembly, including an elongated nozzle body having an inlet end and a discharge end, a central nozzle bore extending axially therethrough, and an inlet for pressurized flowing material into said bore;

an elongated valve plunger movably arranged inside the nozzle bore, the plunger including a plunger body, and at the discharge end thereof a plunger head having a substantially cylindrical seating portion, a plunger neck of a smaller diameter linking the plunger head to the plunger body;

a substantially cylindrical valve bore near the discharge end of the nozzle body assembly, the valve bore communicating with the nozzle bore and serving as a valve seat cooperating with said seating portion of the plunger head, the latter having an outer diameter for sliding contact inside said valve bore, the length of the valve bore being shorter than the length of the plunger neck so that the valve bore and the plunger neck define an annular flow channel, when the plunger is advanced toward the discharge end of the body to an open position in which the plunger head is disengaged from the valve bore;

means for guiding the valve plunger in its axial motion; and a spring engaging the valve plunger and biasing it from its open position toward its retracted position in which the plunger head is seated inside the cylindrical valve bore.

2. An injector nozzle as defined in claim 1, wherein:
the nozzle assembly further includes a valve insert which is removably attached to the nozzle body on the discharge end thereof, the valve insert comprising a central cavity in axial alignment with the nozzle bore and communicating therewith, the valve bore being part of said valve insert cavity.

3. An injector nozzle as defined in claim 2, wherein:
the valve insert cavity includes successively in the direction of material discharge, said valve bore, a mixing chamber having a diameter larger than the valve bore and an axial length in excess of the axial length of the plunger head, and an injection channel forming a discharge outlet from the mixing chamber, the diameter of the injection channel being smaller than that of the valve bore.

4. An injector nozzle as defined in claim 2, wherein:
the valve plunger further includes a plunger collar on its end opposite the plunger head, the plunger collar head being of larger diameter than the plunger body;

the spring is a compression spring, surrounding a major portion of the plunger body and engaging the plunger collar with one of its ends; and the valve insert biases the compression spring against the plunger collar in the direction of retracting the plunger to its closed position.

5. An injector nozzle as defined in claim 4, wherein:
the nozzle bore includes an axial shoulder of a smaller diameter than the plunger collar, said shoulder serving as an abutment for the plunger collar against the spring bias on the plunger so as to determine the retracted, closed plunger position.

6. An injector nozzle as defined in claim 5, wherein:
the nozzle inlet is located axially outside the abutment shoulder in the nozzle bore, and the plunger collar includes longitudinal passages to permit material flow therethrough in the retracted, closed plunger position.

7. An injector nozzle as defined in claim 5, wherein:
the valve insert has an abutment face surrounding the inlet side of its central cavity;

the valve plunger further includes a shaft portion as part of its plunger body, the shaft portion extending between the plunger collar and the plunger neck and forming an axial shoulder with the latter;

the axial shoulder of the shaft portion is larger in diameter than the valve bore and located at such a distance from the plunger head that it abuts against the abutment face of the valve insert in the open plunger position; and the abutted faces of the valve insert and of the axial shoulder of the plunger define a flow passage for the pressurized material from the nozzle bore into the valve bore.

8. An injector nozzle as defined in claim 3, wherein:
the valve bore has an enlarged entry taper and an enlarged exit taper, the latter forming a transition to the larger-diameter mixing chamber.

9. An injector nozzle as defined in claim 3, wherein:
the valve insert is comprised of a valve disc and an axially adjoining valve insert plug, the valve bore being arranged inside the valve disc, while the mixing chamber and the injection channel are arranged inside the valve insert plug.

10. An injector nozzle as defined in claim 9, wherein:
the valve bore in the valve disc has identical entry and exit tapers, the valve disc having an axially symmetric configuration.

11. An injector nozzle as defined in claim 10, further comprising:
at least one separate valve disc having a valve bore of identical diameter, but of different length, said separate valve disc being interchangeable against an installed valve disc, thereby modifying the required opening displacement and opening force of the shutoff valve.

12. An injector nozzle as defined in claim 9, wherein:
the valve insert plug engages the nozzle body by means of a threaded connection, the valve disc being centered inside the nozzle body and axially clampable by tightening the insert plug in the threaded connection.

13. An injector nozzle as defined in claim 9, wherein:
the axial lengths of the mixing chamber and valve bore relative to the axial lengths of the plunger head and plunger neck are such that, in the fully open valve position, the plunger head abuts against the shoulder defined by the mixing chamber at the entrance to the smaller injection channel, while the plunger neck and the valve bore on the one hand, and the plunger head and the mixing chamber on the other hand, form a continuous ring channel; and the abutted faces of the plunger head and of said shoulder define an exit passage for the pressurized material from the mixing chamber to the injection passage.

14. An injector nozzle as defined in claim 13, wherein:
the exit passage for the pressurized material is in the form of a transverse groove in the abutting end portion of the plunger head.

15. An injector nozzle as defined in claim 13, wherein:
the exit passage for the pressurized material is in the form of two oppositely arranged oblique faces on the abutting end portion of the plunger head.

* * * * *